United States Patent
Cui et al.

(10) Patent No.: US 10,691,481 B2
(45) Date of Patent: Jun. 23, 2020

(54) SYSTEM AND METHOD FOR DETECTION OF UNDERPROVISIONING OF MEMORY IN VIRTUAL MACHINES

(71) Applicant: Nutanix, Inc., San Jose, CA (US)

(72) Inventors: Miao Cui, New York, NY (US); Malcolm Crossley, Cambridge (GB); Gaurav Poothia, Redmond, WA (US)

(73) Assignee: NUTANIX, INC., San Jose, CA (US)

( * ) Notice: Subject to any disclaimer, the term of this patent is extended or adjusted under 35 U.S.C. 154(b) by 203 days.

(21) Appl. No.: 15/923,165

(22) Filed: Mar. 16, 2018

(65) Prior Publication Data
US 2019/0286465 A1    Sep. 19, 2019

(51) Int. Cl.
*G06F 9/455* (2018.01)
*G06F 9/50* (2006.01)
*G06F 12/1009* (2016.01)

(52) U.S. Cl.
CPC ........ *G06F 9/45558* (2013.01); *G06F 9/5077* (2013.01); *G06F 12/1009* (2013.01); *G06F 2009/45562* (2013.01); *G06F 2009/45579* (2013.01); *G06F 2009/45583* (2013.01); *G06F 2009/45595* (2013.01);
(Continued)

(58) Field of Classification Search
CPC ............... G06F 9/45558; G06F 9/5077; G06F 12/1009; G06F 2009/45562; G06F 2009/45579; G06F 2009/45583; G06F 2009/45595; G06F 2212/1044;
(Continued)

(56) References Cited

U.S. PATENT DOCUMENTS

| 8,549,518 B1 | 10/2013 | Aron et al. |
| 8,601,473 B1 | 12/2013 | Aron et al. |

(Continued)

OTHER PUBLICATIONS

Nishtala. When cache blocking of sparse matrix vector multiply works and why. [online] Springer-Verlag., pp. 297-311. Retrieved From the Internet <https://link.springer.com/content/pdf/10.1007/s00200-007-0038-9.pdf> (Year: 2007).*

(Continued)

*Primary Examiner* — Emerson C Puente
*Assistant Examiner* — Jonathan R Labud
(74) *Attorney, Agent, or Firm* — Foley & Lardner LLP

(57) ABSTRACT

A system and method include determining underprovisioning of a guest physical memory of a virtual machine running on a computing node. The node includes hardware resources that are mapped the guest physical memory by a hypervisor. The hypervisor receives page fault information from the virtual machine based on page faults in the virtual machine. The hypervisor generates a table that includes virtual memory address-process indicator pair entries and corresponding page fault numbers. The hypervisor removes those entries that have a corresponding page fault number that is less than a first threshold value. The hypervisor determines a size of a revolving memory based on the number of remaining entries and a page size of the guest physical memory. If the revolving memory size is less than a second threshold value in relation to the allocated size of the guest physical memory, the hypervisor indicates underprovisioning of the guest physical memory.

21 Claims, 5 Drawing Sheets

(52) U.S. Cl.
CPC ........... *G06F 2212/1044* (2013.01); *G06F 2212/152* (2013.01); *G06F 2212/652* (2013.01); *G06F 2212/657* (2013.01)

(58) Field of Classification Search
CPC ......... G06F 2212/152; G06F 2212/652; G06F 2212/657
See application file for complete search history.

(56) References Cited

U.S. PATENT DOCUMENTS

| | | | |
|---|---|---|---|
| 8,850,130 | B1 | 9/2014 | Aron et al. |
| 9,594,657 | B2 | 3/2017 | Lee et al. |
| 9,772,866 | B1 | 9/2017 | Aron et al. |
| 2010/0077128 | A1 | 3/2010 | Stansell et al. |
| 2010/0205395 | A1* | 8/2010 | Srinivasan .......... G06F 9/45558 711/170 |
| 2012/0210042 | A1* | 8/2012 | Lim .................... G06F 12/0223 711/6 |
| 2014/0108828 | A1* | 4/2014 | Breternitz .............. G06F 1/329 713/300 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Cano, Ignacio, et al. "Curator: Self-Managing Storage for Enterprise Clusters" (Mar. 27, 2017), from https://www.usenix.org/conference/nsdi17/.

* cited by examiner

SYSTEM AND METHOD FOR DETECTION OF UNDERPROVISIONING OF MEMORY IN VIRTUAL MACHINES

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, present day virtual computing systems still have limitations due to their configuration and the way they operate.

SUMMARY

In accordance with some other aspects of the present disclosure, a system is disclosed. The system includes a virtual machine including a guest operating system, at least one guest physical memory, at least one guest physical processor, and at least one guest physical swap storage. The system also includes a physical processing resource including at least one host physical memory, at least one host physical processor, and at least one host physical swap storage. The system also includes a hypervisor mapping the virtual machine to the physical resources. The hypervisor is configured to receive, from the virtual machine, a plurality of page fault indications and corresponding page fault information. The hypervisor is further configured to store a plurality of virtual memory address-process indicator pair entries in a table, each virtual memory address-process indicator pair entry including a page fault number that is based on a number of page faults from the plurality of page fault indications that include the virtual memory address-process indicator pair in the corresponding page fault information. The hypervisor is also configured to delete a subset of the plurality of virtual memory address-process indicator pair entries from the table that have their corresponding page fault number less than a first threshold value. The hypervisor is further configured to determine, subsequent to deleting the subset of the plurality of virtual memory address-process indicator pair entries from the table, a revolving memory size based on a product of a number of remaining virtual memory address-process indicator pair entries and a page size associated with the at least one guest physical memory. The hypervisor is also configured to determine underprovisioning of the at least one guest physical memory based on the revolving memory size being less than a second threshold value in relation to a size of the at least one physical memory.

In accordance with at least some aspects of the present disclosure, a method is disclosed. The method includes receiving, by a hypervisor, from a virtual machine, a plurality of page fault indications and corresponding page fault information, the virtual machine including a guest operating system, at least one guest physical memory, at least one guest physical processor, and at least one guest physical swap storage, the hypervisor mapping the virtual machine to a physical processing resource. The method further includes storing, by the hypervisor, a plurality of virtual memory address-process indicator pair entries in a table, each virtual memory address-process indicator pair entry including a page fault number that is based on a number of page faults from the plurality of page fault indications that include the virtual memory address-process indicator pair in the corresponding page fault information. The method also includes deleting, by the hypervisor, a subset of the plurality of virtual memory address-process indicator pair entries from the table that have their corresponding page fault number less than a first threshold value. The method additionally includes determining, by the hypervisor, subsequent to deleting the subset of the plurality of virtual memory address-process indicator pair entries from the table, a revolving memory size based on a product of a number of remaining virtual memory address-process indicator pair entries and a page size associated with the at least one guest physical memory. The method additionally includes determining, by the hypervisor, underprovisioning of the at least one guest physical memory based on the revolving memory size being less than a second threshold value in relation to a size of the at least one physical memory.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
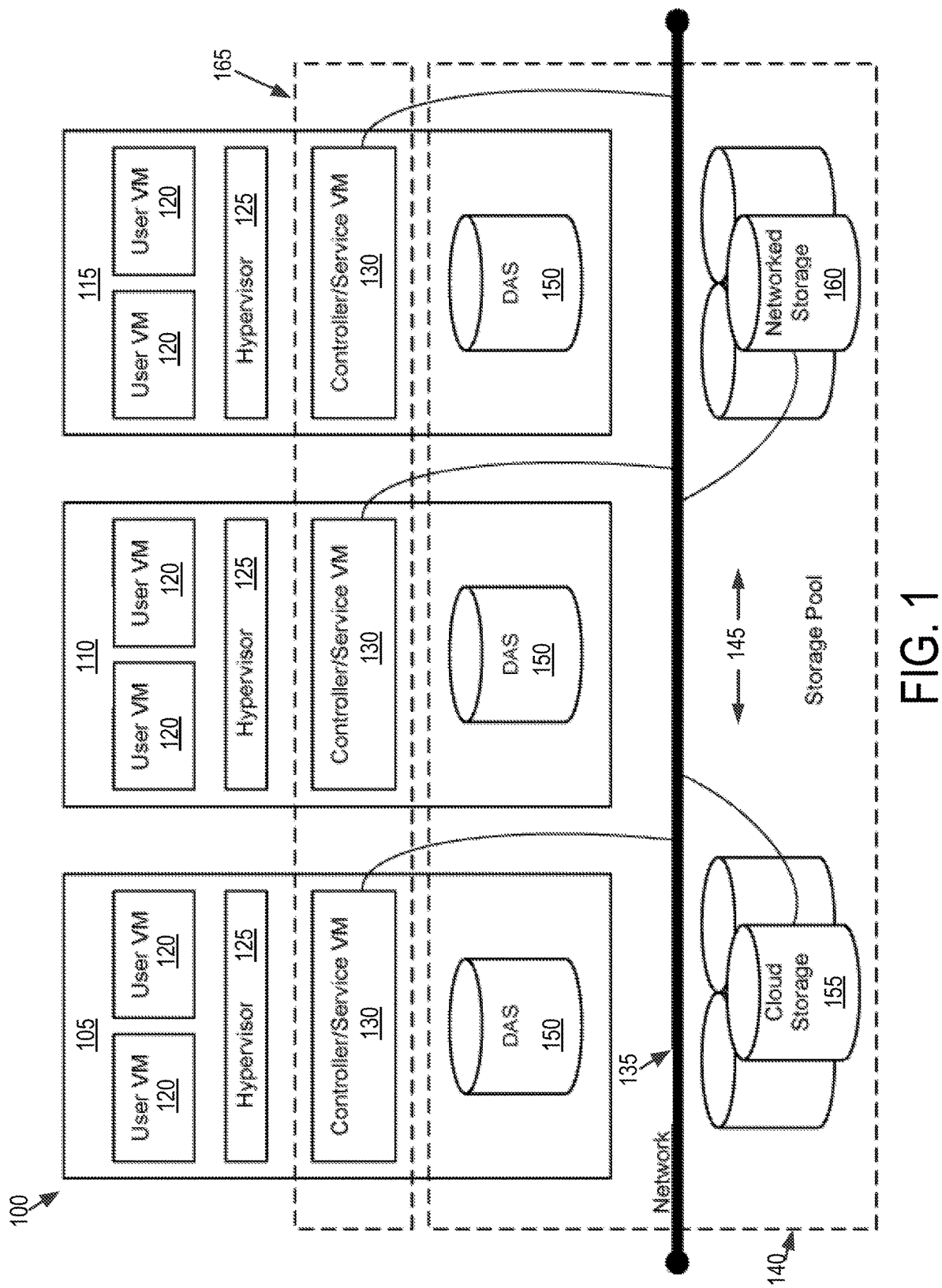
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to operating one or more virtual machines in a computing system using a hypervisor. The virtual machines can include an operating system, a guest physical processor, a guest physical memory, and a guest swap disk. A number of processors can run on the operating system, which can map virtual memory space associated with each process to a portion of memory in the guest physical memory. The size of the guest physical memory is typically predetermined by an administrator or a management module that creates the virtual machine. In some instances, due to lack of space in the guest physical memory, the operating system can swap the contents of memory associated with a process to the guest swap disk. This can result in a page fault when the same process is run again in the future. If the size of the guest processor memory is relatively small, the operating system may have to repeatedly swap memory contents between the guest physical memory and the swap disk. This can result in severe penalties.

One technical problem encountered in such computing systems is lack of indication to the hypervisor that the guest physical memory is thrashing. Some approaches utilize a guest agent running on the guest operating system to provide thrashing information to the hypervisor. But such an approach requires that there be an established trust relationship between the hypervisor and the virtual machine, which is not always possible or advisable due to security concerns. Without the knowledge of the amount of thrashing in the guest physical memory, an management module or an administrator associated with the hypervisor would not be able to take any mitigating actions.

The discussion below provides at least one solution to the technical problems mentioned above. For example, the hypervisor is configured to monitor, without utilizing any guest agents, the guest physical memory to determine whether an unacceptable amount of thrashing is occurring. The hypervisor can receive page fault indications and page fault information from the virtual machine. The hypervisor uses this information to estimate a size of a revolving memory between the guest physical memory and the guest swap disk. Based on the estimate of the revolving memory size, the hypervisor can determine whether the amount of thrashing in the guest physical memory is within acceptable levels. If the amount of thrashing is above unacceptable levels, the hypervisor can raise alarm to indicate this status of the guest physical memory. This can result in increasing the size of the guest physical memory to decrease the likelihood of page faults and thrashing, thereby improving the performance of the virtual machine.

Referring now to FIG. 1, a virtual computing system 100 is shown, in accordance with some embodiments of the present disclosure. The virtual computing system 100 may be part of a datacenter. The virtual computing system 100 includes a plurality of nodes, such as a first node 105, a second node 110, and a third node 115. Each of the first node 105, the second node 110, and the third node 115 includes user virtual machines (VMs) 120 and a hypervisor 125 configured to create and run the user VMs. Each of the first node 105, the second node 110, and the third node 115 also includes a controller/service VM 130 that is configured to manage, route, and otherwise handle workflow requests to and from the user VMs 120 of a particular node. The controller/service VM 130 is connected to a network 135 to facilitate communication between the first node 105, the second node 110, and the third node 115. Although not shown, in some embodiments, the hypervisor 125 may also be connected to the network 135.

The virtual computing system 100 may also include a storage pool 140. The storage pool 140 may include network-attached storage 145 and direct-attached storage 150. The network-attached storage 145 may be accessible via the network 135 and, in some embodiments, may include cloud storage 155, as well as local storage area network 160. In contrast to the network-attached storage 145, which is accessible via the network 135, the direct-attached storage 150 may include storage components that are provided within each of the first node 105, the second node 110, and the third node 115, such that each of the first, second, and third nodes may access its respective direct-attached storage without having to access the network 135.

It is to be understood that only certain components of the virtual computing system 100 are shown in FIG. 1. Nevertheless, several other components that are commonly provided or desired in a virtual computing system are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater or fewer than three nodes may be used. Likewise, although only two of the user VMs 120 are shown on each of the first node 105, the second node 110, and the third node 115, in other embodiments, the number of the user VMs on the first, second, and third nodes may vary to include either a single user VM or more than two user VMs. Further, the first node 105, the second node 110, and the third node 115 need not always have the same number of the user VMs 120. Additionally, more than a single instance of the hypervisor 125 and/or the controller/service VM 130 may be provided on the first node 105, the second node 110, and/or the third node 115.

Further, in some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100.

Each of the first node 105, the second node 110, and the third node 115 may also be configured to communicate and share resources with each other via the network 135. For example, in some embodiments, the first node 105, the second node 110, and the third node 115 may communicate and share resources with each other via the controller/service VM 130 and/or the hypervisor 125. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 140, as well as with other elements of the respective first node 105, the second node 110, and the third node 115 to receive, send, and process information, and to control the operations of the underlying first, second, or third node. The processing units may retrieve a set of instructions from the storage pool 140, such as, from a permanent memory device like a read only memory (ROM) device and copy the instructions in an executable form to a temporary memory device that is generally some form of random access memory (RAM). The ROM and RAM may both be part of the storage pool 140, or in some embodiments, may be separately provisioned from the storage pool. Further, the processing units may include a single stand-alone processing unit, or a plurality of processing units that use the same or different processing technology.

With respect to the storage pool 140 and particularly with respect to the direct-attached storage 150, it may include a variety of types of memory devices. For example, in some embodiments, the direct-attached storage 150 may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 145 may include any of a variety of network accessible storage (e.g., the cloud storage 155, the local storage area network 160, etc.) that is suitable for use within the virtual computing system 100 and accessible via the network 135. The storage pool 140 including the network-attached storage 145 and the direct-attached storage 150 may together form a distributed storage system configured to be accessed by each of the first node 105, the second node 110, and the third node 115 via the network 135 and the controller/service VM 130, and/or the hypervisor 125. In some embodiments, the various storage components in the storage pool 140 may be configured as virtual disks for access by the user VMs 120.

Each of the user VMs 120 is a software-based implementation of a computing machine in the virtual computing system 100. The user VMs 120 emulate the functionality of a physical computer. Specifically, the hardware resources, such as processing unit, memory, storage, etc., of the underlying computer (e.g., the first node 105, the second node 110, and the third node 115) are virtualized or transformed by the hypervisor 125 into the underlying support for each of the plurality of user VMs 120 that may run its own operating system and applications on the underlying physical resources just like a real computer. By encapsulating an entire machine, including CPU, memory, operating system, storage devices, and network devices, the user VMs 120 are compatible with most standard operating systems (e.g. Windows, Linux, etc.), applications, and device drivers. Thus, the hypervisor 125 is a virtual machine monitor that allows a single physical server computer (e.g., the first node 105, the second node 110, and third node 115) to run multiple instances of the user VMs 120, with each user VM sharing the resources of that one physical server computer, potentially across multiple environments. By running the plurality of user VMs 120 on each of the first node 105, the second node 110, and the third node 115, multiple workloads and multiple operating systems may be run on a single piece of underlying hardware computer (e.g., the first node, the second node, and the third node) to increase resource utilization and manage workflow.

The user VMs 120 are controlled and managed by the controller/service VM 130. The controller/service VM 130 of each of the first node 105, the second node 110, and the third node 115 is configured to communicate with each other via the network 135 to form a distributed system 165. The hypervisor 125 of each of the first node 105, the second node 110, and the third node 115 may be configured to run virtualization software, such as, ESXi from VMWare, AHV from Nutanix, Inc., XenServer from Citrix Systems, Inc., etc., for running the user VMs 120 and for managing the interactions between the user VMs and the underlying hardware of the first node 105, the second node 110, and the third node 115. The controller/service VM 130 and the hypervisor 125 may be configured as suitable for use within the virtual computing system 100.

The network 135 may include any of a variety of wired or wireless network channels that may be suitable for use within the virtual computing system 100. For example, in some embodiments, the network 135 may include wired connections, such as an Ethernet connection, one or more twisted pair wires, coaxial cables, fiber optic cables, etc. In other embodiments, the network 135 may include wireless connections, such as microwaves, infrared waves, radio waves, spread spectrum technologies, satellites, etc. The network 135 may also be configured to communicate with another device using cellular networks, local area networks, wide area networks, the Internet, etc. In some embodiments, the network 135 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 140 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120 that are part of a cluster may be configured to share resources with each other.

Figure 2:
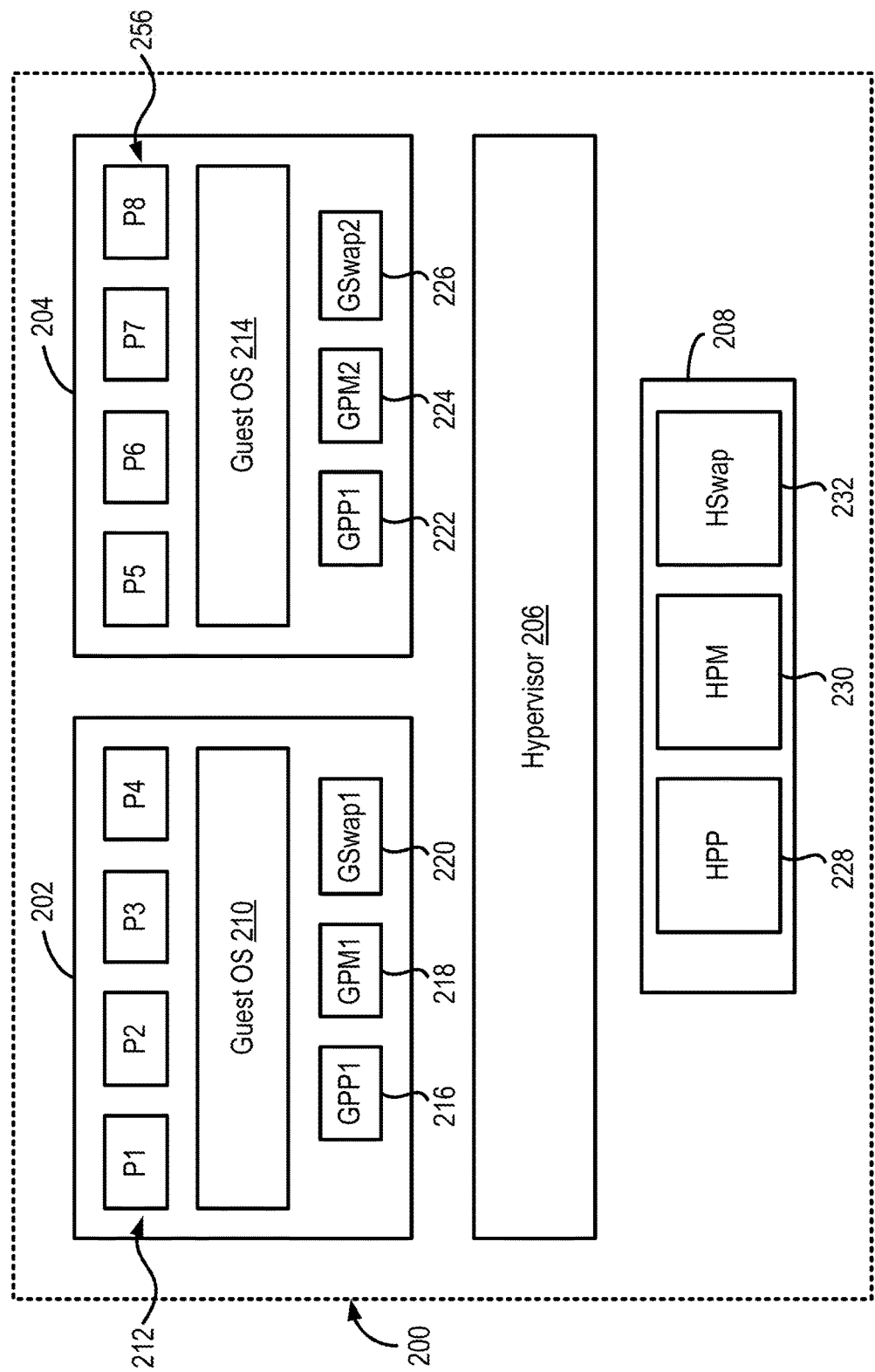
FIG. 2 shows a block diagram of a node used in a virtual computing system, in accordance with some embodiments of the present disclosure.

FIG. 2 shows a block diagram of a node 200 used in a virtual computing system, in accordance with some embodiments of the present disclosure. The node 200 shown in FIG. 2, for example, can be used to implement one or more of the first node 105, the second node 110, and the third node 115 discussed above in relation to FIG. 1. The node 200 includes a first user VM 202, a second user VM 204, a hypervisor 206, and physical hardware resources 208. The first user VM 202 and the second user VM 204 can be similar to the user VMs 120 discussed above in relation to FIG. 1. In addition, the first user VM 202 can include a first guest operating system (OS) 210 that can run a first set of processes 212 (P1, P2, P3, and P4). Similarly, the second user VM 204 can include a second guest OS 214 that can run a second set of processes 256 (P5, P6, P7, and P8). The number of processes in the first and the second set of Processes 212 and 216 shown in FIG. 2 are only examples, and that the respective guest OSs may run fewer or more processes at any given time.

The first user VM 202 also can include one or more guest physical processors, guest physical memories, and guest swap disks. For example, the first user VM 202 can include a first guest physical processor (GPP1) 216, a first guest physical memory (GPM1) 218, and a first guest swap disk (GSwap1) 220. Similarly, the second user VM 204 can include a second guest physical processor (GPP2) 222, a second guest physical memory 224, and a second guest swap disk 226. The number of guest physical processors, guest physical memories, and guest swap disks shown in FIG. 2 are merely an example, and that in other implementations, the first and the second user VMs 202 and 204 may include additional number of guest physical processors, guest physical memories, and guest swap disks. While not shown in FIG. 2, each of the first and the second user VMs 202 and 204 can include a guest physical storage disk. In one or more embodiments, the guest swap disk can be a partition on the guest physical storage disks. It should be noted that the GPP1 216, the GPM1 218, the GSwap1 220, the GPP2 222, GPM2 224, and the GSwap2 226 are not actually physical memories, but virtual processing, memory and storage objects that the hypervisor 206 provides to the first and second user VMs 202 and 204. These virtual objects are the result of the virtualization implemented by the hypervisor 206. In one or more embodiments, the hypervisor 206 may present the same guest physical memory to both the first and the second user VM 202 and 204.

The hypervisor 206 can implement processor, memory, and storage virtualization by abstracting the hardware resources 208 including processors, memory, and I/O devices, and present the abstraction to the first and the second user VMs 202 and 204 as the guest physical processors, guest physical memories and guest swap disks. For example, the hypervisor 206 can implement processor virtualization by scheduling time slots on one or more physical processors of the hardware resources 208 such that from the guest OS's perspective, the time slots are scheduled on the guest physical processors. The hypervisor 206 can implement memory virtualization by maintaining a translation table that translates memory addresses assigned by the guest OSs to physical memory addresses in the physical memories of the hardware resources 208.

The hardware resources 208 can include several processors and memories. While not shown in FIG. 2, the hardware resources may also include one or more I/O resources which can be virtualized and presented as guest physical I/O resources to the first and the second user VMs 202 and 204. The hardware resources 208 can include a host physical processor (HPP) 228, a host physical memory (HPM) 230, and a host swap disk (HSwap) 232. It is understood that the hardware resources 208 can include additional HPPs, HPMs, and HSwap. The HPP 228, the HPM 230 and the HSwap 232 are physical hardware devices such as processor and memory chips that provide physical processing and storage of data. The hardware resources 208 can be shared by the various guest physical processors, guest physical memories and guest swap disks included in the first and the second user VMs 202 and 204.

Each guest OS in the user VMs can provide a virtual memory space to the one or more processes running on the guest OS. For example, the first guest OS 210 can provide a virtual memory space in a first virtual memory to each of the four processes P1-P4 212 running on the first guest OS 210. Similarly, the second guest OS 214 can provide a virtual memory space in a second virtual memory to each of the four processes P5-P8 256 running on the second guest OS 214. The virtual memory space provided to the processors can be divided into blocks of a certain size (such as, for example, 4 kB) and can be referred to as pages. Each guest OS maps the virtual memory space provided to each processor to the respective guest physical memory. For example, the first guest OS 210 can map the virtual memory space provided to each process in the first set of processes 212 to memory locations in the GPM1 218. Similarly, the second guest OS 214 can map the virtual memory space provided to each process in the second set of processes 256 to memory locations in the GPM2 224. The information mapping the virtual memory space seen by the processes to the guest physical memory can be stored in page table. The guest OS can create a page table for each process, and map the virtual memory addresses within the virtual memory space provided to that process to memory locations in the guest physical memory. For example, the guest OS 210 can generate a page table for each of the four processes in the first set of processes 212. Whenever a process is being executed, the guest OS can load the page table corresponding to that process to determine addresses mappings to the guest physical memory.

The hypervisor 206 also maintains a memory map. Specifically, the hypervisor 206 stores memory mapping between the guest physical memories (GPM1 218 and GPM2 224) and the host physical memory 230 in the hardware resources 208 of the host. The hypervisor 206 can store this mapping information in a physical mapping table, which maps memory locations in the guest physical memories to the host physical memories. Thus, the combined mapping information included in the page tables and the physical mapping table can provide mapping between the virtual memory space seen by a process and the physical memory location in the host physical memory.

The hypervisor 206 may also maintain a mapping between the guest physical storage and the host physical storage. For example, the hypervisor 206 can store mapping information between storage addresses in the GSwap1 220 and the corresponding addresses in the HSwap 232. Similarly, the hypervisor can also store mapping information between the addresses in the GSwap2 226 and the corresponding addresses in the HSwap 232.

As mentioned above, the guest OSs can allocate each of their respective processes a virtual memory space in the guest physical memory. The size of the guest physical memory is typically fixed. In some embodiments, the size of the guest physical memory can be set during initial configuration and installation. During the operation of the user VMs, the size of the guest physical memory may not be sufficient to support the virtual memory space allocated to the processes. For example, assume that the GPM1 218 is configured to have a size of 6 GB, and the process P1 is allocated a virtual memory space of 4 GB. Now process P2 begins execution and request allocation of 4 GB of virtual memory space. As the size of the GPM1 218 is 6 GB, it cannot simultaneously accommodate the virtual memory spaces for processes P1 and P2. To this end, the first guest OS 210 can swap-out the 4 GB of the memory in the GPM1 218 allocated to the process P1 to the GSwap1 220. That is, the contents of the portion of the GPM1 218 allocated to the process P1 are swapped-out to the GSwap1 220. This frees up memory in the GPM1 218. The first guest OS 210 can then allocate the requested 4 GB of memory to the process P2. When the first guest OS 210 swaps-out the portion of the GPM1 218 allocated to the process P1, the first guest OS 210 also can update the page table associated with the process P1 to indicate that the its memory allocation has been swapped out.

If the process P1 is executed again in the future, and tries to access a page associated with a memory location within its virtual memory space, the GPM1 218 or a memory management unit in the first user VM 202 will generate a page fault. The page fault is generated because the memory associated with the process P1 does not exist in the GPM1 218. Typically, the GPM1 218 or the memory management unit can generate an interrupt to the first guest OS 210 upon the generation of the page fault. The memory management unit may also fault the execution of the process P1. The first guest OS 210, responsive to receiving the page fault interrupt, can access the GSwap1 220, and swap-in the contents of the memory associated with the process P1, back into the GPM1 218. Once the memory contents are swapped-in to the GPM1 218, the guest OS 210 can clear the page fault, which in turn can result in the resumption of the execution of the process P1.

It should be noted that the swapping-in of the memory contents from the swap disk back into the guest physical memory may cause the guest OS to swap-out memory contents associated with some other process or processes to make space for the swapped-in memory. Thus, the next time those processes are executed and try to access pages associated with their virtual memory space, page faults will be generated, and the guest OS will have to carry out the swapping-in and perhaps swapping-out of memory contents between the guest physical memory and the swap disk. The repeated processes of swapping-in and swapping-out of memory contents between the guest physical memory and the swap disk can be referred to as memory thrashing. Memory thrashing can have performance penalties due to the latencies associated with swapping-in and swapping-out of memory contents between the guest physical memory and the swap disk. Memory thrashing can increase with the disproportionality between the size of the guest physical memory and the total memory allocation requested by the processes running on the guest OS. A predetermined amount of memory thrashing can indicate that the guest physical memory is underprovisioned. This can, in turn, indicate perhaps the size configuration of the guest physical memory was insufficient, and that reconfiguration of the guest physical memory may be warranted.

While the guest OS can detect memory thrashing by monitoring the number and the frequency of page faults, the hypervisor alone is typically unable to detect memory thrashing. In one approach, the guest OS can include a program such as a guest agent, that detects memory thrashing and notifies the hypervisor. But this approach needs a trusted relationship between the guest OS and the hypervisor, which is not always possible or recommended due to maintaining security. Moreover, given the multitude of operating systems that a hypervisor may have to support, a guest agent would have to be programmed and installed for each of those multitudes of operating systems. The approach discussed below allows the hypervisor to detect memory thrashing, and based on the extent of memory thrashing, can detect whether the guest physical memory has been underprovisioned.

Figure 3:
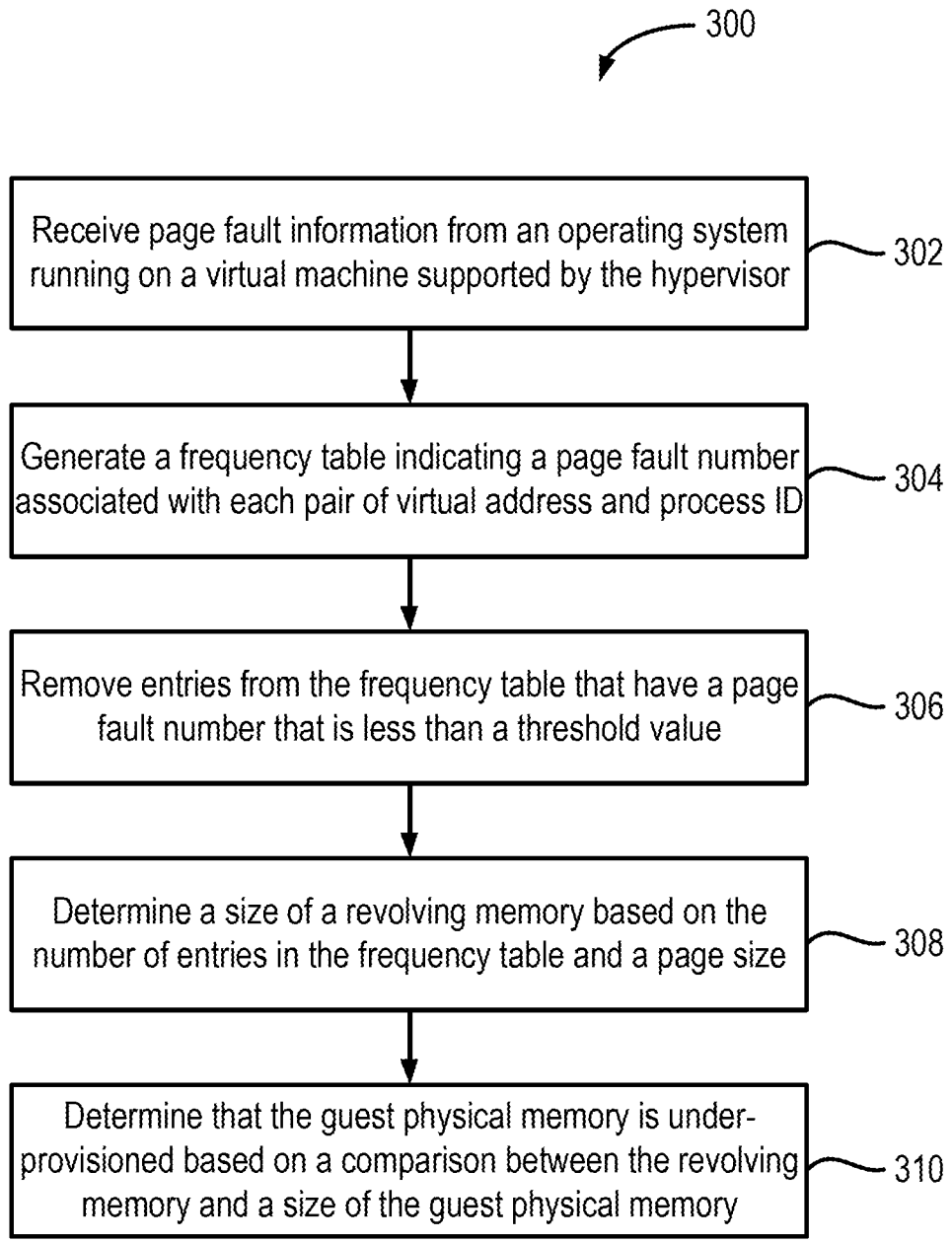
FIG. 3 shows a flow diagram of a process for detecting memory thrashing within a virtual machine, in accordance with some embodiments of the present disclosure.

FIG. 3 shows a flow diagram of a process 300 for detecting memory thrashing within a virtual machine. Additional, fewer, or different operations may be performed depending on the implementation. The process 300 includes receiving page fault information from an operating system running on a virtual machine supported by a hypervisor (operation 302). Referring to FIG. 2, the hypervisor 206 can detect memory thrashing in the first guest OS 210. When a page fault occurs, the memory management unit of the first user VM 202 or the first guest OS 210 can provide the hypervisor with page fault information. In one or more embodiments, the page fault information can include a virtual address of the page that resulted in the fault as a process page table address. For example, if the execution of the process P1 resulted in a page fault, the hypervisor 206 can receive from the first user VM 202 the virtual address of the page being requested by the process P1 as well as the address of the page table associated with the process P1. In one or more embodiments, the hypervisor 206 may also receive, as part of the page fault information, an indication of whether the page fault was a result of a read operation or a write operation, an indication of whether the page fault was a protection page fault or some other page fault, and an indication whether the page fault was a user or a kernel page fault. For example, in x86 systems, an interrupt 14 occurs due to a page fault. An exception error code associated with the interrupt 14 can indicate the page fault information. Systems with other architectures can also provide similar information.

The process 300 further includes generating a frequency table indicating a number of page faults associated with each pair of virtual address and process identifier (operation 304). As mentioned above, the hypervisor 206 can receive page fault information for each page fault occurring in the first user VM 202. Depending upon the number of processing running on the first guest OS 210, and the number of page faults, the hypervisor can receive several page fault indication accompanied with the page fault information. One aspect of detecting memory thrashing is to detect whether a same portion of the virtual memory associated with a same process is being constantly swapped-in and swapped-out between the guest physical memory and the swap disk. One way to keep track of this is to generate a frequency table or some other data structure that stores a virtual address and a process identifier pair, and a number indicating the number of page faults that include the virtual address and the process identifier in the page fault information.

Figure 4:
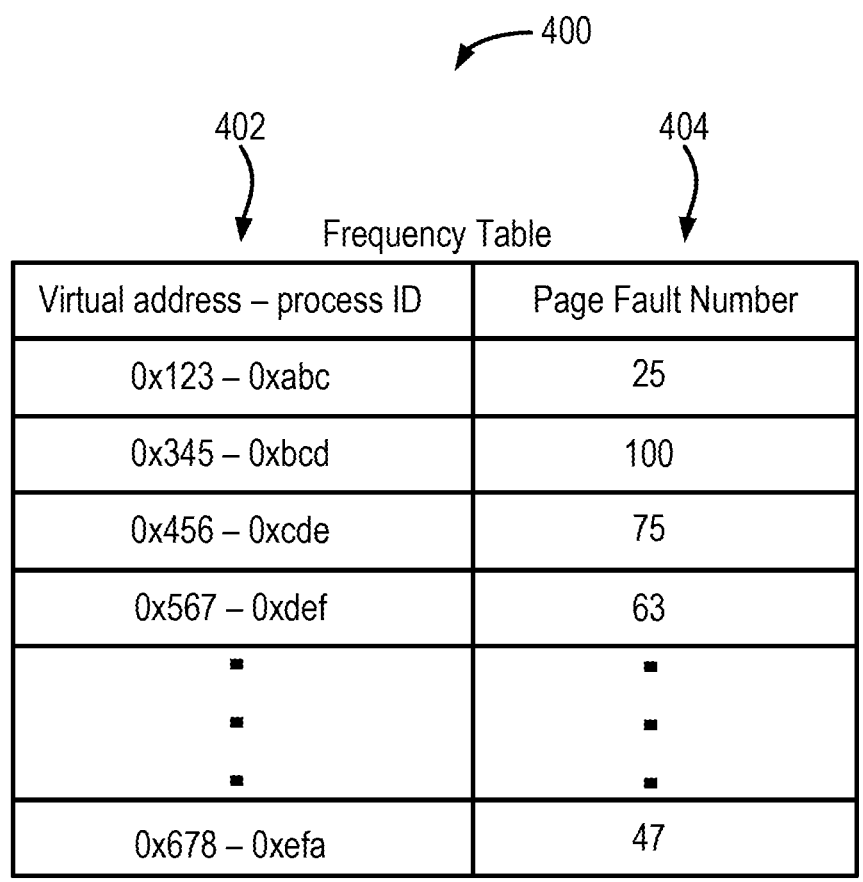
FIG. 4 shows an example page fault frequency table, in accordance with some embodiments of the present disclosure.

FIG. 4 shows an example page fault frequency table 400. The page fault frequency table includes a first column 402 that includes virtual address and process identifier pairs of all the page faults received by the hypervisor 206, and a second column that includes a page fault number that is based on the number of times the virtual address and process identifier appear in the page fault information received with the page faults. As an example, the first row of the first column includes two addresses: 0x123 and 0xabc. These are merely example addresses, and the actual entries will vary based on the implementation. The first address, 0x123, represents the virtual address in the virtual memory space and the second address. The second address, 0xabc, represents the address where the page table of the process is stored in the guest physical process. The address of the page table of a process can be unique to that process. Therefore, this address can be used as a process identifier. This can be beneficial where the actual process ID of the process maintained by the respective guest operating system is not known. The address of the page table of the process can serve as a proxy for the actual process ID of the process maintained by the guest operating system. It should be noted that the process page table address can be replaced by any other indictor that uniquely identifies the process, such as a process ID, if that information is included in the page fault information received from the user VM.

The second column 404 indicates the page fault number, which can be based on the number of page faults in which the virtual address-processor identifier pair has appeared. The hypervisor can compare all the virtual address-process identifier pairs included in the frequency table 400 with each page fault information received within a time period to determine whether that page fault information includes a matching virtual address and process identifier. If there is a match, the hypervisor can adjust the page fault number in the second column 404 associated with that virtual address-process identifier pair. If the hypervisor receives page fault information that includes a virtual address-process identifier pair that is not included in the frequency table, the hypervisor 206 can create a new entry for that pair in the transition table and determine a corresponding page fault number accordingly.

In one or more embodiments, the page fault number in the second column 404 of frequency table 400 can indicate an average number of page faults per unit time. For example, the hypervisor 206 can determine the average number of page faults received that have matching virtual address-process identifier pair every 10 ms. In some other embodiments, a page fault number in the second column 404 may represent a sum of all page faults received over a moving window of time, such as for example, the last 10 seconds. In some other embodiments, the page fault number in the second column 404 can represent a moving average of the number of page faults that have matching virtual address-process identifier pair.

The process 300 also includes removing entries from the frequency table that have a page fault number that is less than a threshold (operation 306). The hypervisor 206 can determine a threshold number that is indicative of an unacceptable amount of memory thrashing. For example, referring to FIG. 4, if the page fault number is less than say, 5 over a time period of about 5 ms, then the hypervisor 206 may remove corresponding entry from the frequency table 400. In one or more embodiments, removing such entries can be beneficial in the remainder of the frequency table more accurately reflecting the thrashing occurring in the system. For example, if the page fault number associated with an entry is a low value, such as 1, then that value merely represents a memory swap-in event. A single memory swap-in event does not even represent a thrashing event, as the thrashing event is caused when there is memory swap-in and memory swap-out. Therefore, as that entry does not contribute to thrashing, it can be removed. In addition, even low level page fault numbers do not typically cause thrashing. Therefore, entries with numbers less than a threshold can also be removed. The threshold value can be selected based on the implementation.

Figure 5:
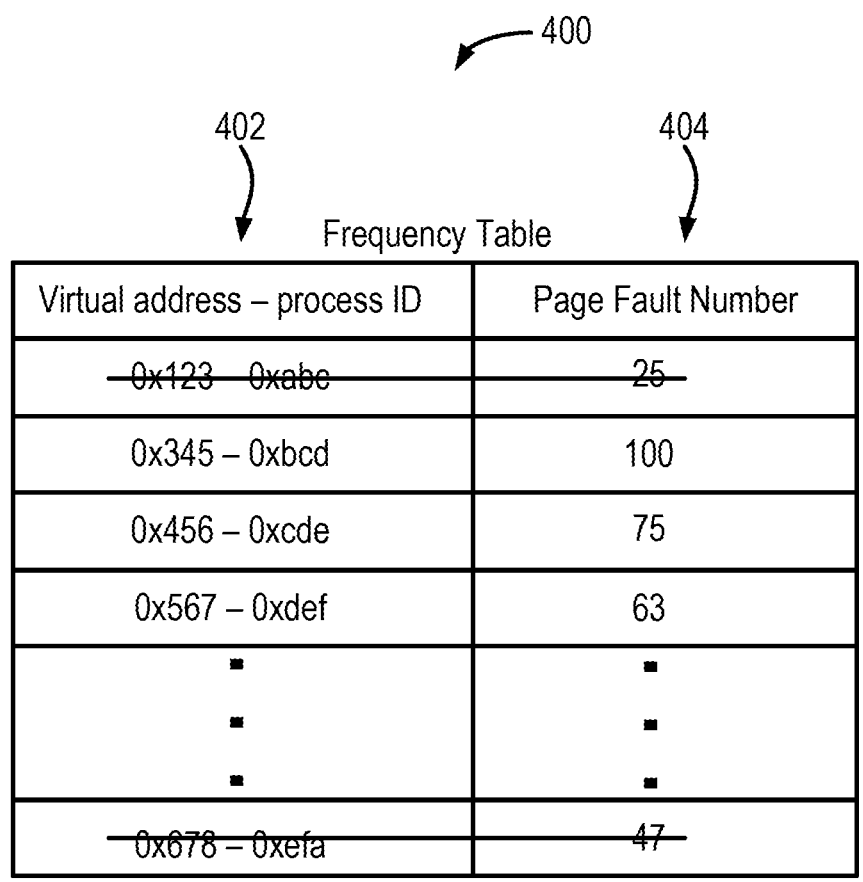
FIG. 5 shows a modified frequency table based on a threshold value, in accordance with some embodiments of the present disclosure.

FIG. 5 shows a modified frequency table 400 based on a threshold value. The hypervisor 206 can generate the modified frequency table 500 based on a threshold value of 50. The page fault numbers associated with the first entry and the last entry in the first column 402 are less than 50. Therefore, the hypervisor 206 can delete the first entry and the last entry in the frequency table 400.

The hypervisor 206 can repeatedly update the frequency table 400 as the page fault numbers may change over time. In some such embodiments, the hypervisor 206 can periodically determine if any entries in the frequency table should be deleted based on the threshold value. In some other embodiments, the hypervisor 206 can update the frequency table 400 if it receives a threshold number of total page faults within a certain time period. For example, a large number of page faults received in a given period may indicate that the memory thrashing is above a predetermined level, and that an update to the frequency table 400 to remove entries may be beneficial. In some other embodiments, the hypervisor 206 can update the frequency table 400 if the number of entries within the table exceeds a threshold value. For example, if the number of entries exceeds 100, the hypervisor 206 can reduce the threshold value, and remove entries, such that the total number of entries is below 100.

The process 300 also includes determining a size of a revolving memory based on the entries in the frequency table (operation 308). In one or more embodiments, the hypervisor 206 can determine the amount of revolving memory by multiplying the number of entries in the frequency table 400 with a page size. The page size can indicate the page size associated with the guest physical memory. The page size can represent the smallest unit of memory that the guest OS can swap-in and swap-out between the guest physical memory and the swap disk. Referring to the modified frequency table shown in FIG. 5, assume that the number of entries in the frequency table 400 is three, and the page size is P KB. The hypervisor 206 can determine that the revolving memory is equal to 3×P KB.

The process 300 further includes determining that the guest physical memory is underprovisioned based on a comparison between the revolving memory and the size of the guest physical memory (operation 310). As mentioned above, the hypervisor 206 can determine the revolving memory based on the number of entries in the frequency table and the page size. The revolving memory can represent the amount of memory that is repeatedly being swapped between the guest physical memory and the swap disk. It may be desirable to have the size of revolving memory to be less than the size of the guest physical memory by a certain amount. For example, it may be desirable to have a ratio of the size of the revolving memory to the size of the guest physical memory to be less than a threshold value. In another example, it may be desirable to have the difference between the sizes of the revolving memory and the guest physical memory to be below a threshold. In any case, if the threshold values are exceeded, it can be determined that the guest physical is thrashing. Referring to the example mentioned above, the hypervisor 206 may determine that the guest physical memory is thrashing if the ratio of the size of the revolving memory to the size of the guest physical memory is greater than a threshold value of 0.75. The determination of thrashing can indicate that the guest physical memory has not been configured with a size that is appropriate for supporting the workload.

In one or more embodiments, responsive to the determination that the guest physical memory is thrashing, the hypervisor 206 can reconfigure the size of the guest physical memory to an appropriate amount. For example, the hypervisor 206 can select a size that is at least about 25% to about 50% or about 30% more than the size of the revolving memory. By increasing the size of the guest physical memory, swapping of memory contents between the guest physical memory and the swap disk can be reduced. As a result, the number of page faults and the associated performance penalties can be reduced, thereby improving the performance of the use VM.

It is to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A processor having programmed instructions that, when executed, cause the processor to:
   store a plurality of virtual memory address process indicator pair entries in a data structure, each virtual memory address process indicator pair entry corresponding to a virtual memory address-process pair generating a page fault, each virtual memory address-process indicator pair entry including an indicator of a number of page faults in a time period;
   determine a revolving memory size based on a number of virtual memory address-process indicator pair entries and a page size associated with a guest physical memory;
   determine provisioning status of the guest physical memory based on the revolving memory size; and
   increase the size of the guest physical memory based on the revolving memory size or generate a notification recommending the increase.

2. The processor of claim 1, wherein the indicator of the number of page faults in the time period indicates an average of the number of page faults in the time period.

3. The processor of claim 1, wherein the indicator of the number of page faults in the time period indicates a total number of page faults in the time period.

4. The processor of claim 1, further having programmed instructions to: determine underprovisioning of the guest physical memory based on the revolving memory size being less than a second threshold value in relation to a size of the physical memory.

5. The processor of claim 1, further having programmed instructions to: delete a subset of the plurality of virtual memory address-process indicator pair entries from a page table periodically.

6. The processor of claim 1, wherein the process indicator includes a memory address of a page table associated with a process running on the virtual machine.

7. The processor of claim 1, further having programmed instructions to trigger an alarm when underprovisioning is determined.

8. A method comprising:
storing, by a hypervisor, a plurality of virtual memory address-process indicator pair entries in a data structure, each virtual memory address-process indicator pair entry corresponding to a virtual memory address-process pair generating a page fault, each virtual memory address-process indicator pair entry including an indicator of a number of page faults in a time period;
determining, by the hypervisor, a revolving memory size based on a number of virtual memory address-process indicator pair entries and a page size associated with a guest physical memory;
determining, by the hypervisor, provisioning status of the guest physical memory based on the revolving memory size; and
increasing, by the hypervisor, the size of the guest physical memory based on the revolving memory size or generating a notification recommending the increase.

9. The method of claim 8, wherein determining a revolving memory size are based on a product of a number of virtual memory address-process indicator pair entries and a page size associated with a guest physical memory.

10. The method of claim 8, wherein the indicator of the number of page faults in the time period indicates a total number of page faults in the time period.

11. The method of claim 8, further comprising determining by the hypervisor, underprovisioning of the guest physical memory based on the revolving memory size being less than a second threshold value in relation to a size of the at least one physical memory.

12. The method of claim 8, further comprising periodically deleting, by the hypervisor, a subset of the plurality of virtual memory address-process indicator pair entries from a page table that have their corresponding page fault number less than the first threshold value.

13. The method of claim 8, wherein the process indicator includes a memory address of a page table associated with a process running on the virtual machine.

14. A non-transitory computer-readable computer medium having instructions stored, the instructions comprising:
instructions for storing a plurality of virtual memory address-process indicator pair entries in a data structure, each virtual memory address-process indicator pair entry corresponding to a virtual memory address-process pair generating a page fault, each virtual memory address-process indicator pair entry including an indicator of a number of page faults in a time period;
instructions for determining a revolving memory size based on a number of virtual memory address-process indicator pair entries and a page size associated with a guest physical memory;
instructions for determining provisioning status of the guest physical memory based on the revolving memory size; and
instructions for increasing the size of the guest physical memory based on the revolving memory size or generating a notification recommending the increase.

15. The non-transitory computer readable medium of claim 14, wherein the indicator of the number of page faults in the time period indicates an average of the number of page faults in the time period.

16. The non-transitory computer readable medium of claim 14, wherein the indicator of the number of page faults in the time period page fault number indicates a total number of page faults in the time period from the plurality of page fault indications that include the virtual memory address-process indicator pair in the corresponding page fault information received over a period of time.

17. The non-transitory computer readable medium of claim 14, further comprising instructions for determining underprovisioning of the guest physical memory based on the revolving memory size being less than a second threshold value in relation to a size of the at least one physical memory.

18. The non-transitory computer readable medium of claim 17, further comprising instructions for triggering an alarm when underprovisioning is determined.

19. The non-transitory computer readable medium of claim 14, further comprising instructions for periodically deleting a subset of the plurality of virtual memory address-process indicator pair entries from a page table that have their corresponding page fault number less than the first threshold value.

20. The non-transitory computer readable medium of claim 14, wherein the indicator of the number of page faults in the time period indicates a total number of page faults in the time period.

21. The non-transitory computer readable medium of claim 14, wherein the instructions for determining a revolving memory size are based on a product of a number of virtual memory address-process indicator pair entries and a page size associated with a guest physical memory.

* * * * *